United States Patent
Brown

(10) Patent No.: US 11,582,903 B1
(45) Date of Patent: Feb. 21, 2023

(54) VISION BASED GUIDANCE SYSTEM AND METHOD FOR LAWN MOWING DEVICES

(71) Applicant: Hydro-Gear Limited Partnership, Sullivan, IL (US)

(72) Inventor: Alyn G. Brown, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 412 days.

(21) Appl. No.: 15/982,914

(22) Filed: May 17, 2018

Related U.S. Application Data

(60) Provisional application No. 62/507,744, filed on May 17, 2017.

(51) Int. Cl.
*A01D 34/00* (2006.01)
*B60W 10/08* (2006.01)
(Continued)

(52) U.S. Cl.
CPC ........... *A01D 34/008* (2013.01); *B60W 10/08* (2013.01); *B60W 10/20* (2013.01); *B60W 40/02* (2013.01);
(Continued)

(58) Field of Classification Search
CPC . A01D 34/008; A01D 2101/00; B60W 10/08; B60W 10/20; B60W 40/02;
(Continued)

(56) References Cited

U.S. PATENT DOCUMENTS

| 4,868,752 A | * | 9/1989 | Fujii | G05D 1/0246 701/28 |
| 5,938,709 A | * | 8/1999 | Hale | G01C 21/20 342/357.52 |

(Continued)

FOREIGN PATENT DOCUMENTS

| EP | 2286653 | 2/2011 |
| EP | 2944174 | 11/2015 |

(Continued)

OTHER PUBLICATIONS

"Amazing Remote Control Lawn Mower—Spider Mini RC Mower", published on YouTube by "Spectral" on Dec. 21, 2015 https://www.youtube.com/watch?v=fpJOeKwv1hw (Year: 2015).*
(Continued)

*Primary Examiner* — Thomas E Worden
(74) *Attorney, Agent, or Firm* — Neal, Gerber & Eisenberg LLP

(57) ABSTRACT

Vision based guidance system and method for lawn mowing devices are disclosed. An exemplary method for operating an autonomous lawn mower includes receiving, via a receiver, a perimeter data set from a handheld computer. The perimeter data set includes a perimeter outline of at least one perimeter that is determined utilizing a GPS unit of the handheld computer. The exemplary method also includes collecting, via at least one camera, images of a set area within the perimeter outline and mowing, via a mowing blade, grass within the set area. The exemplary method also includes autonomously steering, via a controller, the autonomous lawn mower based on the perimeter outline of the at least one perimeter and the images captured by the at least one camera.

3 Claims, 16 Drawing Sheets

(51) Int. Cl.
  *B60W 10/20* (2006.01)
  *B60W 40/02* (2006.01)
  *G05D 1/02* (2020.01)
  *A01D 101/00* (2006.01)

(52) U.S. Cl.
  CPC ............ *G05D 1/02* (2013.01); *A01D 2101/00* (2013.01); *B60W 2300/15* (2013.01); *B60W 2420/42* (2013.01); *B60W 2530/00* (2013.01); *B60W 2554/00* (2020.02); *B60W 2555/20* (2020.02); *B60W 2556/00* (2020.02); *B60W 2710/081* (2013.01); *B60W 2710/207* (2013.01); *B60W 2710/30* (2013.01); *G05D 2201/0208* (2013.01)

(58) Field of Classification Search
  CPC ......... B60W 2554/00; B60W 2555/00; B60W 2556/00; B60W 2300/15; B60W 2420/42; B60W 2530/00; B60W 2710/081; B60W 2710/207; B60W 2710/30; G05D 1/02; G05D 2201/0208
  See application file for complete search history.

(56) References Cited

U.S. PATENT DOCUMENTS

| | | | |
|---|---|---|---|
| 6,338,013 B1* | 1/2002 | Ruffner | A01D 34/008 701/23 |
| 6,611,738 B2 | 8/2003 | Ruffner | |
| 6,819,780 B2 | 11/2004 | Benson et al. | |
| 6,832,000 B2 | 12/2004 | Herman et al. | |
| 7,103,457 B2* | 9/2006 | Dean | A01D 34/008 318/568.12 |
| 7,133,746 B2 | 11/2006 | Abramson et al. | |
| 7,434,642 B2 | 10/2008 | Dettmann | |
| 7,953,526 B2* | 5/2011 | Durkos | G05D 1/0246 340/286.02 |
| 8,239,083 B2* | 8/2012 | Durkos | G05D 1/0219 700/245 |
| 8,412,419 B1 | 4/2013 | Seamon et al. | |
| 8,428,776 B2* | 4/2013 | Letsky | A01D 34/008 700/245 |
| 8,666,550 B2 | 3/2014 | Anderson et al. | |
| 8,706,297 B2* | 4/2014 | Letsky | A01D 34/008 700/245 |
| 8,731,295 B2* | 5/2014 | Schepelmann | G06T 7/11 382/173 |
| 8,958,939 B2 | 2/2015 | Einecke et al. | |
| 9,137,943 B2 | 9/2015 | Einecke et al. | |
| 9,188,980 B2 | 11/2015 | Anderson | |
| 9,349,187 B2 | 5/2016 | Schepelmann et al. | |
| 9,420,741 B2 | 8/2016 | Balutis et al. | |
| 9,456,545 B2* | 10/2016 | Biber | A01D 34/008 |
| 9,497,901 B2* | 11/2016 | Willgert | G05D 1/0246 |
| 9,499,199 B1* | 11/2016 | Laymon | B60L 50/10 |
| 9,538,702 B2* | 1/2017 | Balutis | G05D 1/0219 |
| 9,603,300 B2* | 3/2017 | Pettersson | A01D 34/008 |
| 9,867,331 B1* | 1/2018 | Siudyla | A01D 34/008 |
| 9,980,434 B1 | 5/2018 | Brown | |
| 9,983,586 B2 | 5/2018 | Borinato | |
| 10,157,334 B2 | 12/2018 | Schepelmann et al. | |
| 2005/0066912 A1* | 3/2005 | Korbitz | A01K 15/023 119/721 |
| 2006/0059880 A1* | 3/2006 | Angott | A01D 34/008 56/10.2 A |
| 2009/0102668 A1* | 4/2009 | Thompson | A01K 15/023 340/573.3 |
| 2010/0106344 A1 | 4/2010 | Edwards et al. | |
| 2012/0312250 A1* | 12/2012 | Jesurum | A01K 15/023 119/721 |
| 2014/0215984 A1 | 8/2014 | Bischoff | |
| 2015/0025755 A1* | 1/2015 | Willgert | A01B 69/007 701/50 |
| 2015/0128547 A1* | 5/2015 | Einecke | A01D 34/008 56/10.2 A |
| 2015/0163993 A1 | 6/2015 | Pettersson | |
| 2016/0073275 A1* | 3/2016 | Inoue | E02F 9/264 |
| 2016/0100522 A1* | 4/2016 | Yamauchi | A01D 34/008 701/25 |
| 2016/0174459 A1* | 6/2016 | Balutis | B25J 9/1674 701/25 |
| 2017/0289754 A1* | 10/2017 | Anderson | H04W 4/029 |
| 2017/0303466 A1* | 10/2017 | Grufman | A01D 34/008 |
| 2017/0364088 A1* | 12/2017 | Grufman | G05D 1/0274 |
| 2017/0364090 A1* | 12/2017 | Grufman | G05D 1/0214 |
| 2018/0035606 A1* | 2/2018 | Burdoucci | A01D 34/008 |
| 2018/0103579 A1* | 4/2018 | Grufman | A01D 34/008 |
| 2019/0163174 A1* | 5/2019 | Ko | G05D 1/0011 |
| 2019/0163175 A1* | 5/2019 | Ko | G05D 1/0088 |

FOREIGN PATENT DOCUMENTS

| | | |
|---|---|---|
| JP | 2944774 | 9/1999 |
| WO | WO2018000922 | 1/2018 |
| WO | WO2018220528 | 12/2018 |

OTHER PUBLICATIONS

"agria 9600 remote control high grass rotary mulcher", published on YouTube by "agriaWerke" on Aug. 24, 2015 https://www.youtube.com/watch?v=chwO0p3rjpc (Year: 2015).*
U.S. Appl. No. 14/918,465, filed Oct. 20, 2015.
MacmeDan, "Self Driveing Lawn Mower Remote Control Autonomous Lawn Mower Using RaspberryPi," Technology Electronics, Sep. 10, 2015, 13 pp.
Mowbotix Lawn Automations; <https://www.mowbotix.com/>, Jan. 10, 2018, 2 pp.
MowPilot, Community Project: Autonomous Mower with Navio2 running ROS, Dec. 9, 2016, 2 pp.
YouTube video, Mowbotix Inc. Gas Control System, Retrieved from https://www.youtube.com/watch?v=VSxQZN9Ds6Q, Oct. 8, 2017.
Chandler, et al., "Autonomous Agent Navigation Based on Textural Analysis," 2002 Florida Conference on Recent Advances in Robotics, 6 pp.
Chandler, et al., "Texture Analysis: A Technique for Autonomous Lawnmower Navigation," 2001 Florida Conference on Recent Advances in Robotics, 7 pp.
Chen, "Going Deeper with Convolutional Neural Network for Intelligent Transportation," Worcester Polytechnic Institute, Electronic Theses and Dissertations, Jan. 28, 2016, 70 pp.
Franzius, et al., "Embedded Robust Visual Obstacle Detection on Autonomous Lawn Mowers," Honda R&D Europe, Germany, 2017, 9 pp.
Guo, et al., "Vision-based Lawn Boundary Recognition for Mowing Robot," Advances in Computer Science Research, vol. 52, 2016 International Conference on Computer Engineering and Information Systems, 5 pp.
Holder, et al., "From On-Road to Off: Transfer Learning within a Deep Convolutional Neural Network for Segmentation and Classification of Off-Road Scenes," Computer Vision ECCV 2016 workshops: Amsterdam, The Netherlands, 15 pp.
LeCun, et al., "Off-Road Obstacle Avoidance through End-to-End Learning," Advances In Neural Information Processing Systems, 2006, 8 pp.
Ulanoff, Review of iRobot Roomba 980 on mashable.com, Sep. 17, 2015, 19 pp.

* cited by examiner

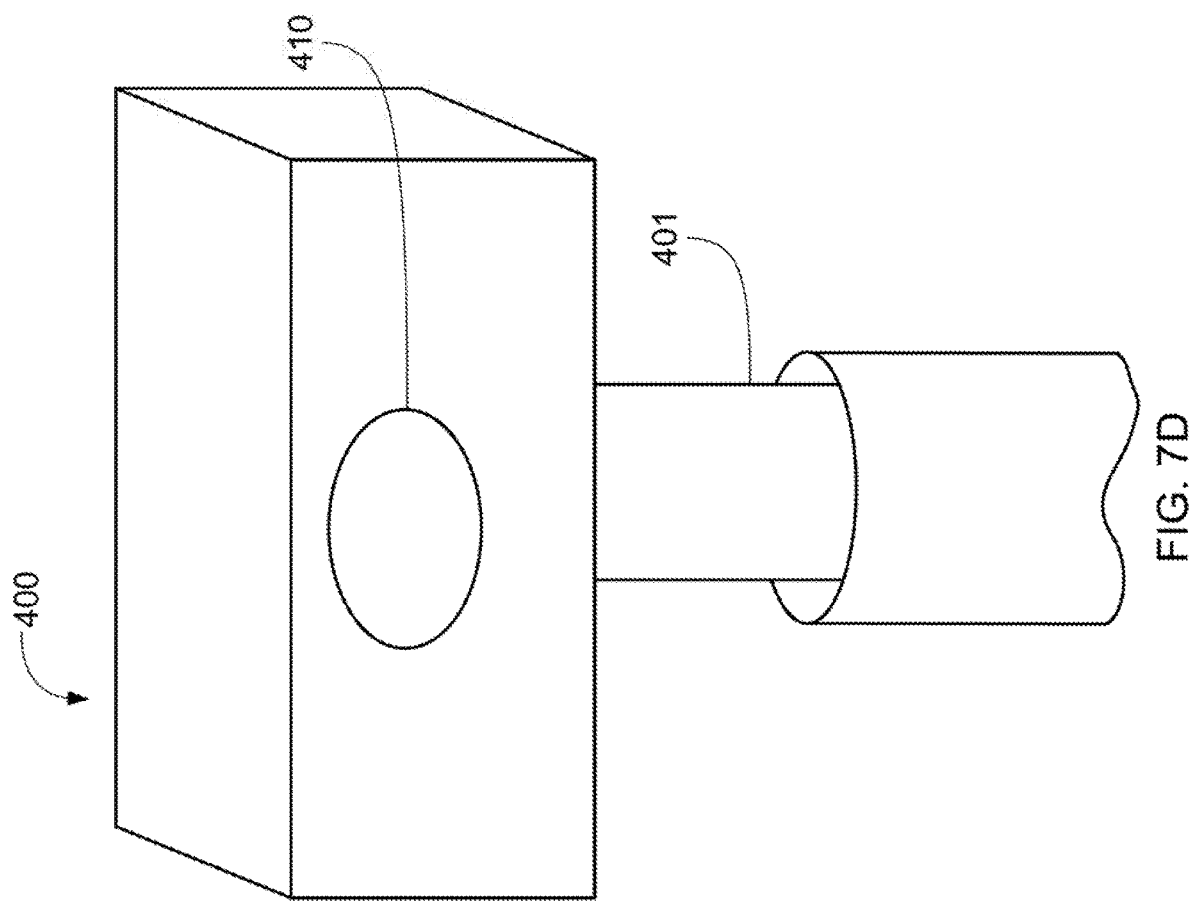

VISION BASED GUIDANCE SYSTEM AND METHOD FOR LAWN MOWING DEVICES

CROSS-REFERENCE

This application claims the benefit of U.S. Provisional Patent App. No. 62/507,744, filed on May 17, 2017. This prior application is incorporated by reference herein in its entirety.

BACKGROUND OF THE INVENTION

This application relates to the field of lawnmowers and more particularly a vision based guidance system for autonomous lawnmowers and enhanced control of lawnmowers. Typical autonomous lawnmowers operate in one of two different ways. First, a perimeter wire may be buried or placed around the perimeter of the property that one wishes to mow. The robot mower then travels in a somewhat random pattern, changing direction when an obstacle is encountered, or when it encounters the perimeter wire. Alternatively, GPS is used to "geo-fence" the perimeter of the lawn, and is used to provide navigational routing to the autonomous mower.

The perimeter wire boundary/random navigation method allows the robot mower platform to be fairly unsophisticated and inexpensive. The autonomous mower travels randomly through the yard, and travels back to a home charging station when the batteries are low. It continues to do this at relatively frequent intervals so that the entire yard is eventually mowed. It typically does not mow the entire yard in a single pass.

The GPS boundary/GPS navigation system allows the autonomous robot to travel a pre-programmed, or a more purposeful path. The optimum mowing scenario can be programmed in and executed to minimize the inefficiency associated with the more random mow styles. The positioning accuracy of the GPS system is limited to the positioning accuracy of the GPS system on the robot and of the signal. Oftentimes stationary radio beacons, or other local reference points are used in order to increase the accuracy of the GPS based autonomous navigation systems. Neither of these methods of operation are ideal and both leave room for improvement.

SUMMARY OF THE INVENTION

The object of the present invention is a visual based navigation system that allows the autonomous mower to "see" its surroundings with a camera. This system works much the way a human eye does. Light that is reflected off of an object is picked up by a camera (or a plurality of cameras). The information from the camera is fed into a computer that then makes decisions based on information from that image. Such information may include distance from one or more objects in the image, whether the object(s) are stationary or moving, and the like. Determinations can be made as to whether a collision with the object(s) is likely and if so, where such collision will occur. By way of example, the system may be programmed to detect humans or pets or other obstacles such as trees, fences, shrubbery, or toys. Once such an obstacle is detected, the processor determines whether the mower is on a collision course with the obstacle; if so, the processor modifies the course of the mower to avoid the collision. If a determination is made that a collision cannot be avoided, the processor sends the necessary signal to stop the mower.

The system also makes the determination to proceed based on other factors in its environment. For example, the system can detect grass based on color. If grass is detected along the path of the mower, the mower will be directed to continue along that path. If, on the other hand the system detects something that is not grass (concrete, pavement, mulch or the like) then the system directs the mower to change course to a path on which grass is detected. If no such path can be located, the system commands the mower to stop and may return the mower to its starting point or home base.

Such determinations may be made, for example, by the creation of a plurality of images of the area within the field of view visible to the camera, and the processor receiving data relating to the pixels associated with each of these images. The processor may process color-related information and process location data from one image to the next. As the camera refreshes the images, the processer analyzes the pixel data and compares this data from the current image to the prior image to determine what changes have occurred.

In one scenario a plurality of cameras are used to receive images in real time. These images are processed, and information about the surroundings can be calculated. For example, the difference in images from a left and right camera can be used to calculate the distance from an object in the image and the autonomous platform. In such a scenario, the processor receives image data sets from two separate cameras that are spaced a known distance apart. The processor compares the pixel data set from one camera to the pixel data set from the second camera to triangulate the distance and determine the distance from the mower to the object. As the processor receives refreshed images and pixel data sets, the processor compares sequential images and can determine, e.g., if any of the objects are moving.

An alternative approach is to use a neural network type of learning system to analyze the image received by the camera and make immediate decisions about heading correction based on the images. In this scenario there is no need to measure the distance to certain objects, and there is no need for real time calculation. The neural net processes the information in real time and makes decisions whether or not the autonomous mower should turn left, turn right, reverse, go forward, and or stop.

Once the autonomous machine has completed its duty cycle, or day of use, information about the decision making process can be uploaded to a cloud based neural network processing site where the information is processed. This information helps the neural network learn how to make better decisions the next time it mows a yard.

In practice, the disclosure herein creates a low cost, very efficient method that the autonomous mower can use to navigate grass, uncut grass, obstacles, and patterns. The machine can be set to mow the perimeter of the yard, using visual indicators of the yard. For example, if the yard is bounded by fence, gardens, mulch, or other feature, the autonomous robot could mow the perimeter of the yard following the visible yard perimeter. In a situation where there is no visual yard boundary, a low cost, low positioning accuracy GPS can be used to provide a geo-pseudo fence. The operator could manually mow the perimeter and the system would use the GPS to provide data for the system about the preferred perimeter path; this stored perimeter data would essentially create a stored geo-fence to determine the outside perimeter to be mowed. It will be understood that the manual mowing referred to above could entail a user driving a mower about the perimeter, or the remote control operation of a suitably equipped vehicle about the perimeter. In such cases, the mower would have both autonomous and non-autonomous capabilities.

A user could also map this outside perimeter using a smart phone or tablet computer using a mapping application manually by, e.g., walking the perimeter. The GPS coordinates would be downloaded to the autonomous system and used to define the geo-fence.

The systems disclosed herein can also be programmed to turn the power take off (i.e., the blades of the lawn mower) on or off depending on the detection of cut or uncut grass, such that the lawn mower is not wasting energy while traversing a previously cut section. The systems could also be programmed for turning the power take off to the off position in case of certain obstacles being detected.

Once the perimeter of the yard has been mowed, the visual based navigation system can then navigate the mower to follow the last mow path by recognizing the prior mow path. Each mow pass thereafter could continue to follow the mow line of the previous pass and properly align the vehicle. There are many situations where home or lawn owners would prefer a different pattern for their yard than a decreasing perimeter shape. In these situations it may take a combination of multiple sensors on the autonomous mower to get the desired result. In the various embodiments discussed herein, it will be understood that the system would incorporate data about the mower, such as the deck width, spacing between mower wheels and outer effective area of the mowing deck in order to maximize efficiency of this process. Such information would likely be preprogrammed by the mower manufacturer, but could be modified as needed if the vehicle is updated or changed.

An alternative embodiment of the present invention includes a GPS system for Geo-Fencing, Visual Navigation system for yard navigation, and an inertial measurement unit ("IMU") for straight line tracking and performance. In such an embodiment, the GPS system provides the rough perimeter within which the mower must stay, the visual system provides the fine navigational orientation needed to efficiently mow and to avoid obstacles, and the IMU gives the system the ability to go straight.

In a further embodiment the disclosed visual navigation system may be used on and provide added benefit to a manually operated mower. More specifically, the disclosed visual assist system allows the operator of the mower to automatically follow the last mow path line that he created. The operator can use the IMU on his manual mower to create a perfectly straight line, and then engage the Visual Assist. The operator would then turn the mower for the next pass and align the mower with the expected proper mow path. The visual assist system would then precisely follow the previous cut mow line, at the correct spacing to maximize the efficiency and minimize the multi lap overlap. If a highly skilled operator can mow with a 3" overlap, the disclosed visual mowing system could reduce that overlap to less than 1". The following describes a possible method of operation using the visual mowing system disclosed herein: (a) the operator mows a straight pass using manual mower and IMU; (b) the operator turns the mower around at the end of the pass and aligns the mower with the last pass (normal operation); (c) operator engages the visual mowing system; (d) the visual mowing system navigates the mower to precisely follow the previous pass; and (e) the operator repeats the above steps.

A better understanding of the invention will be obtained from the following detailed descriptions and accompanying drawings, which set forth illustrative embodiments that are indicative of the various ways in which the principles of the invention may be employed.

BRIEF DESCRIPTION OF THE DRAWINGS

FIG. 7D is a perspective view of a typical single lens camera on elevated mount for use in connection with the system of the present disclosure.

DETAILED DESCRIPTION OF THE DRAWINGS

Figure 1:
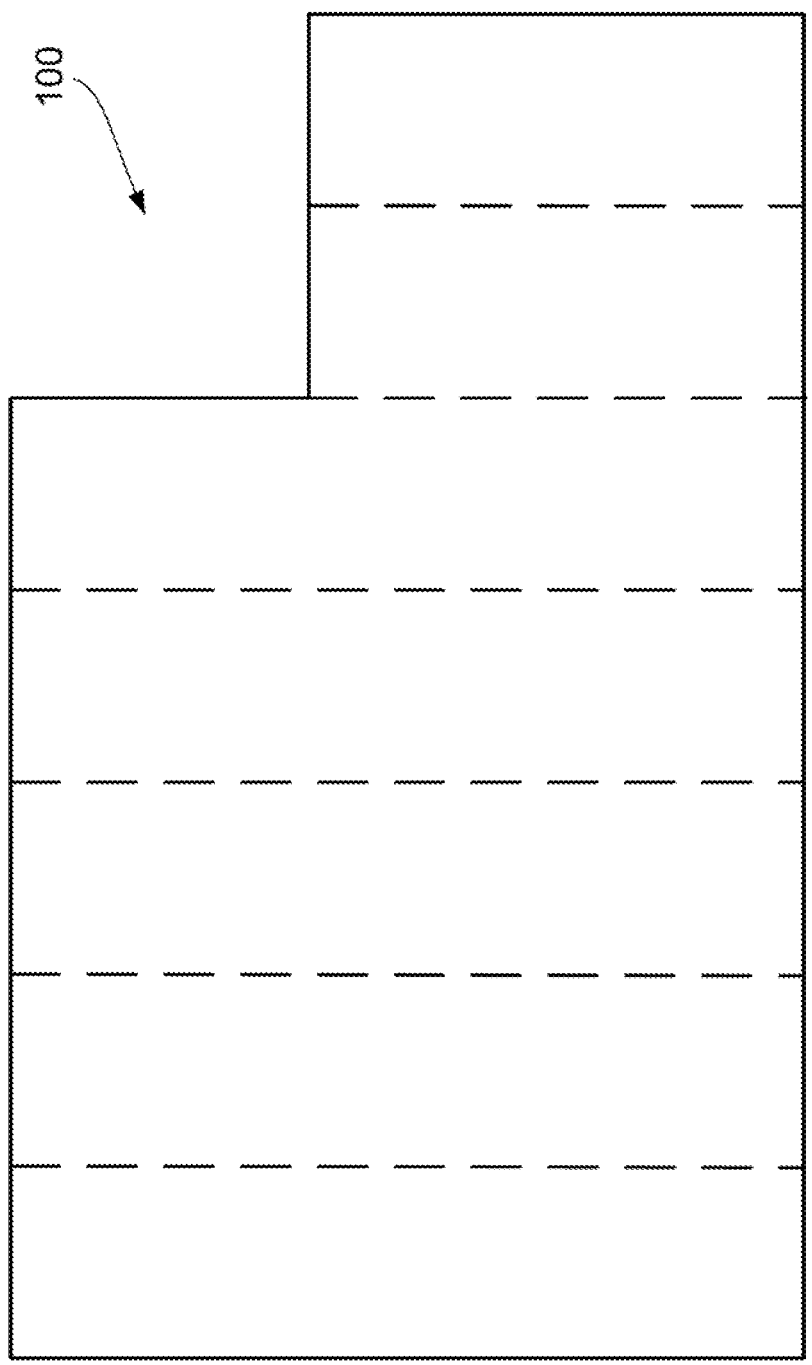
FIG. 1 is an overhead view of a typical lawn in which a system in accordance with the present teachings may be used.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 2:
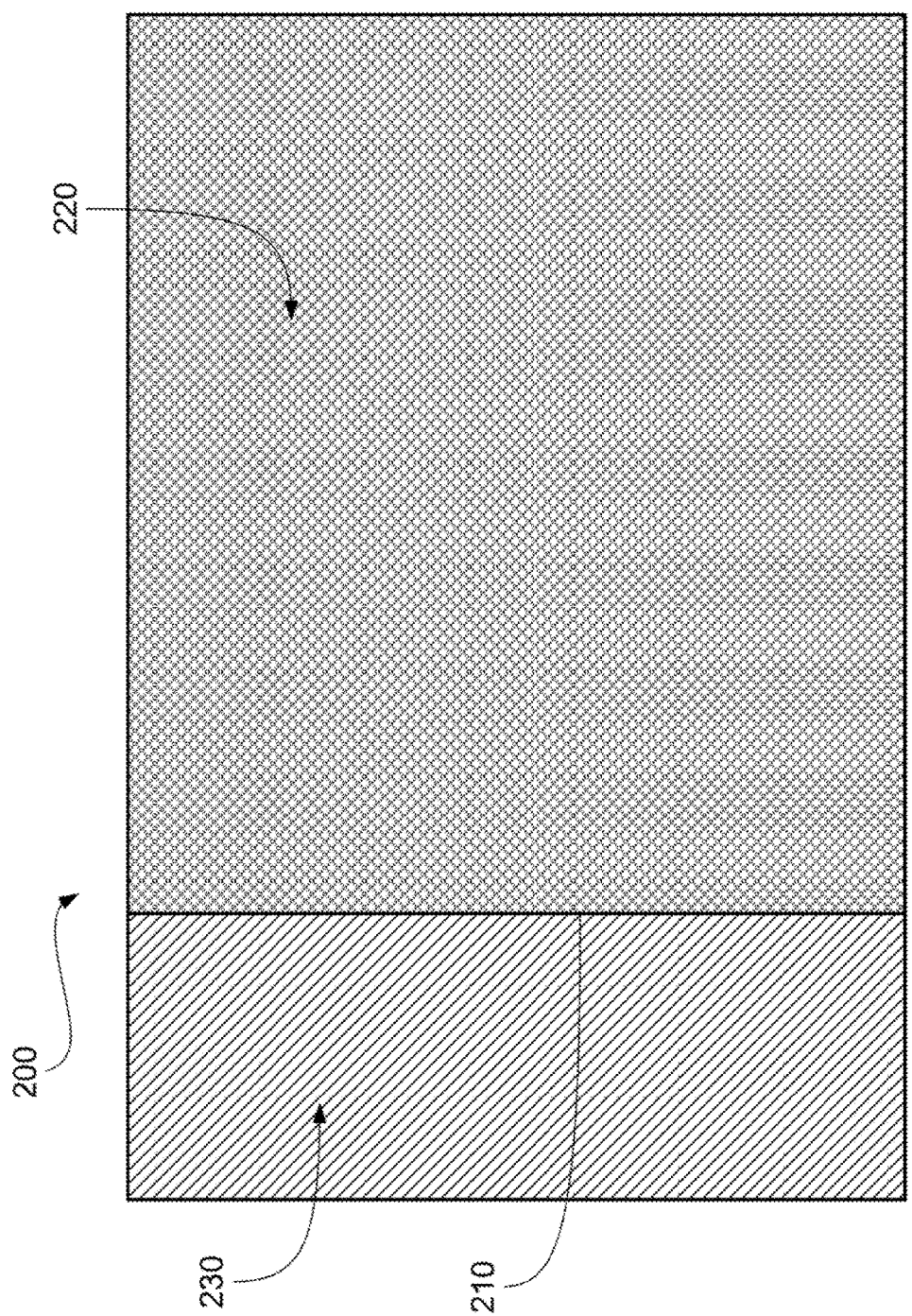
FIG. 2 is an overhead view of a typical lawn with a mowed section and an un-mowed section.

FIGS. 1 and 2 depict views of a typical lawn 100, 200 in which a system in accordance with the present teachings may be used, with FIG. 2 showing the mowed section 230 and an un-mowed section 220, with a mow path or mow line 210 separating the two sections.

Figure 3:
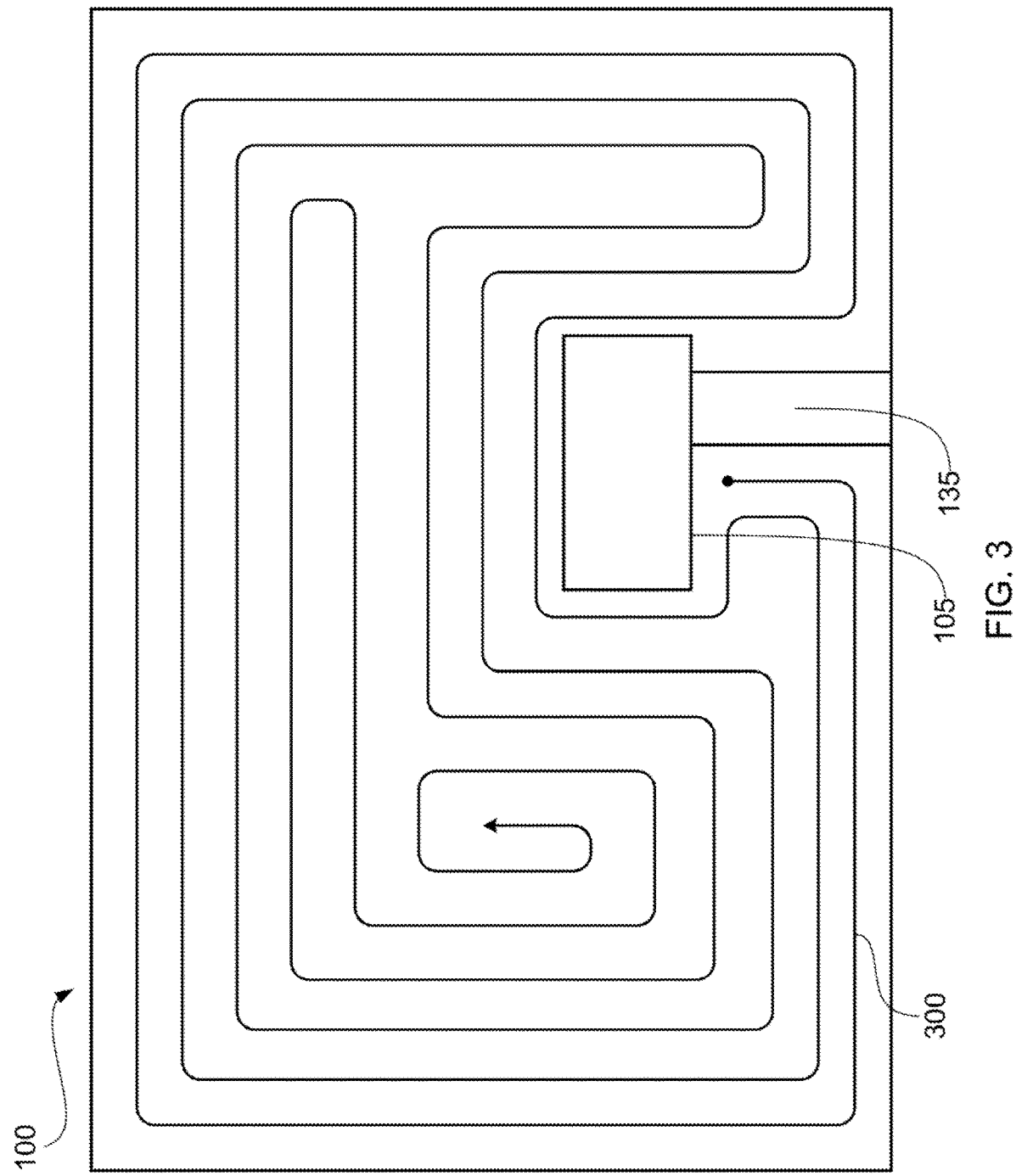
FIG. 3 is an overhead view of a lawn with a contour mow path depicted.
Figure 3A:
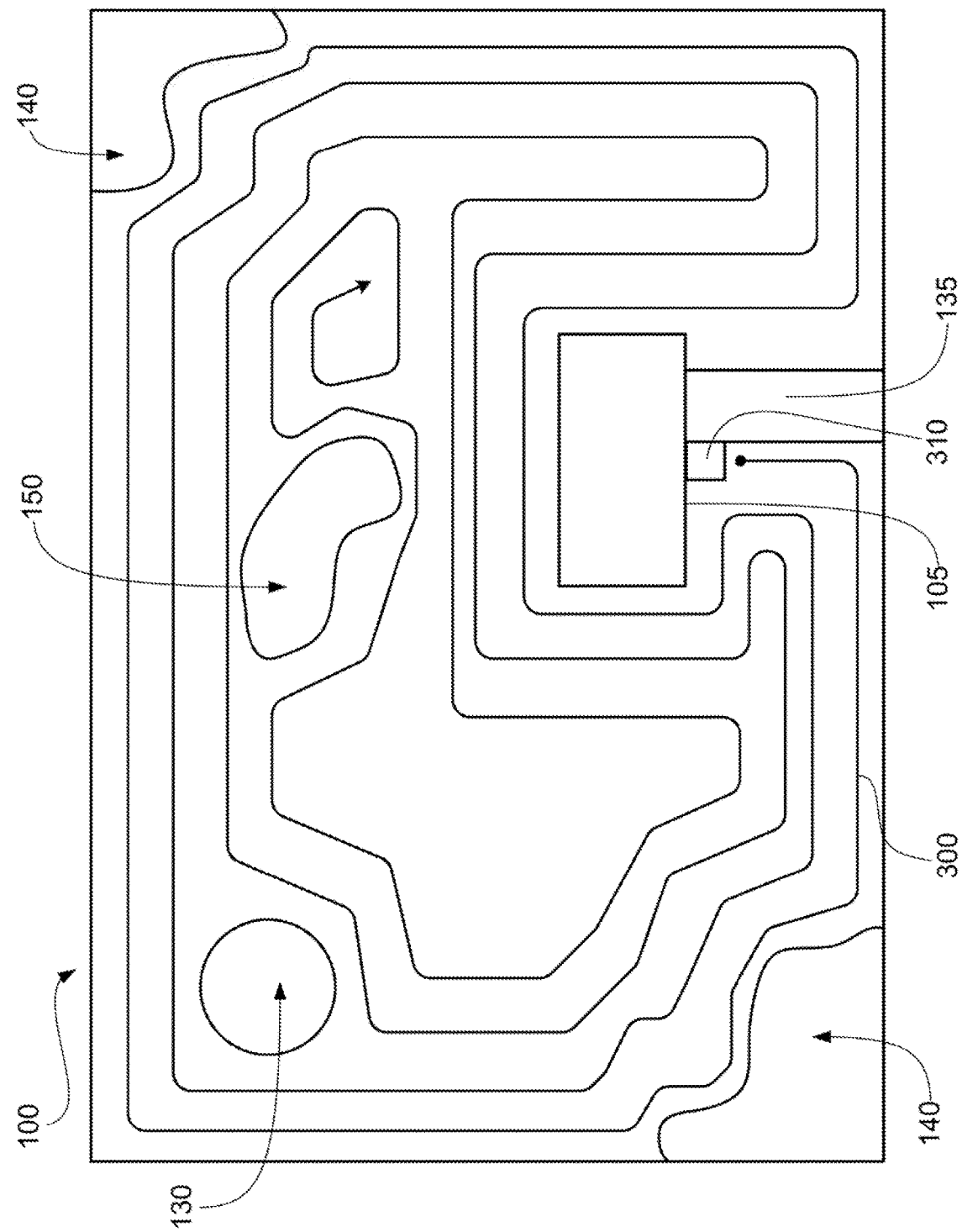
FIG. 3A is an overhead view of a lawn with a curved contour path depicted.
Figure 4:
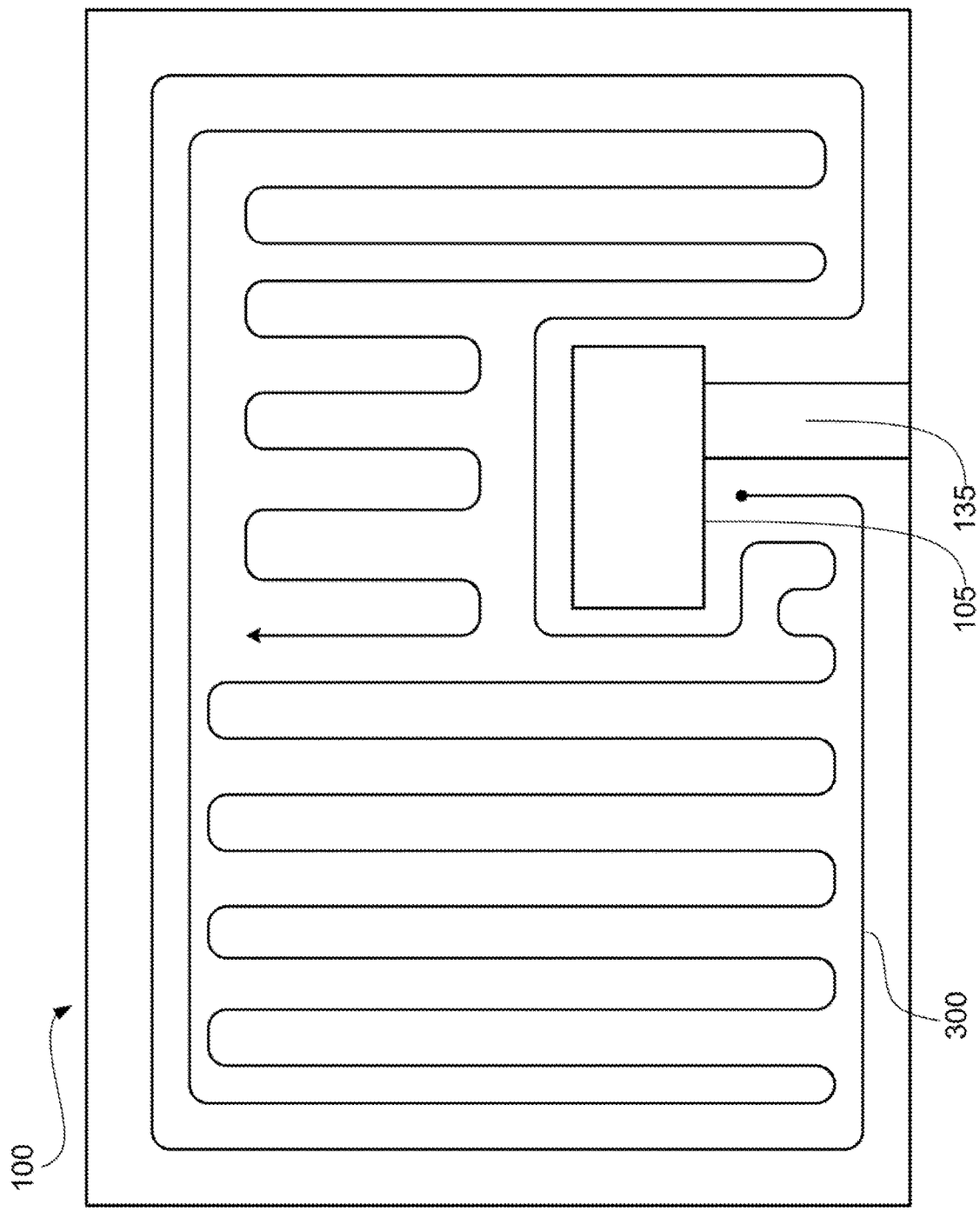
FIG. 4 is an overhead view of a lawn with a straight line mow path depicted.
Figure 5:
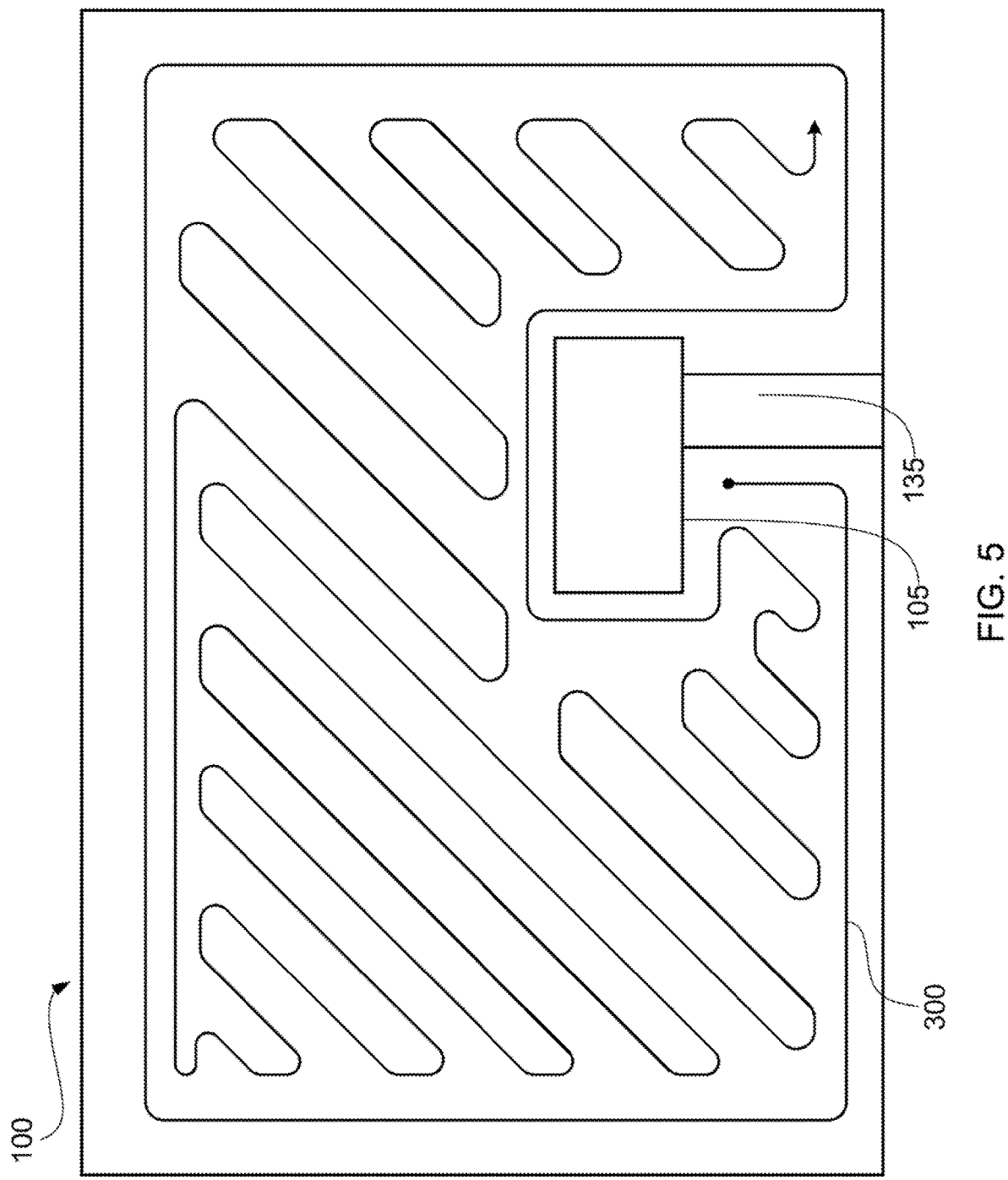
FIG. 5 is an overhead view of a lawn with a diagonal mow path depicted.

FIGS. 3-5 show overhead views of a lawn with a differing mow paths depicted. By way of example, FIG. 3A is an overhead view of a lawn with a curved contour path 300 depicted. House 105 may have a mower charging station 310 located nearby and a driveway 135 which will act as a part of the perimeter for the area to be mowed. Other obstacles that may be present in the area to be mowed include one or more trees 130, a pool or other water feature 150 and other landscape features 140, the size and shape of which may vary. These obstacles may create various "pinch points" where the system of the mower may consider it to have completed the entire yard, when that pinch point has been fully mowed. For such yards, it is desirable to create multiple components or segments, such that the system will recognize that when one segment is completed that it is to move to a different segment. It may be required to create multiple perimeters within a single yard, as described below with regard to FIG. 11.

Figure 6:
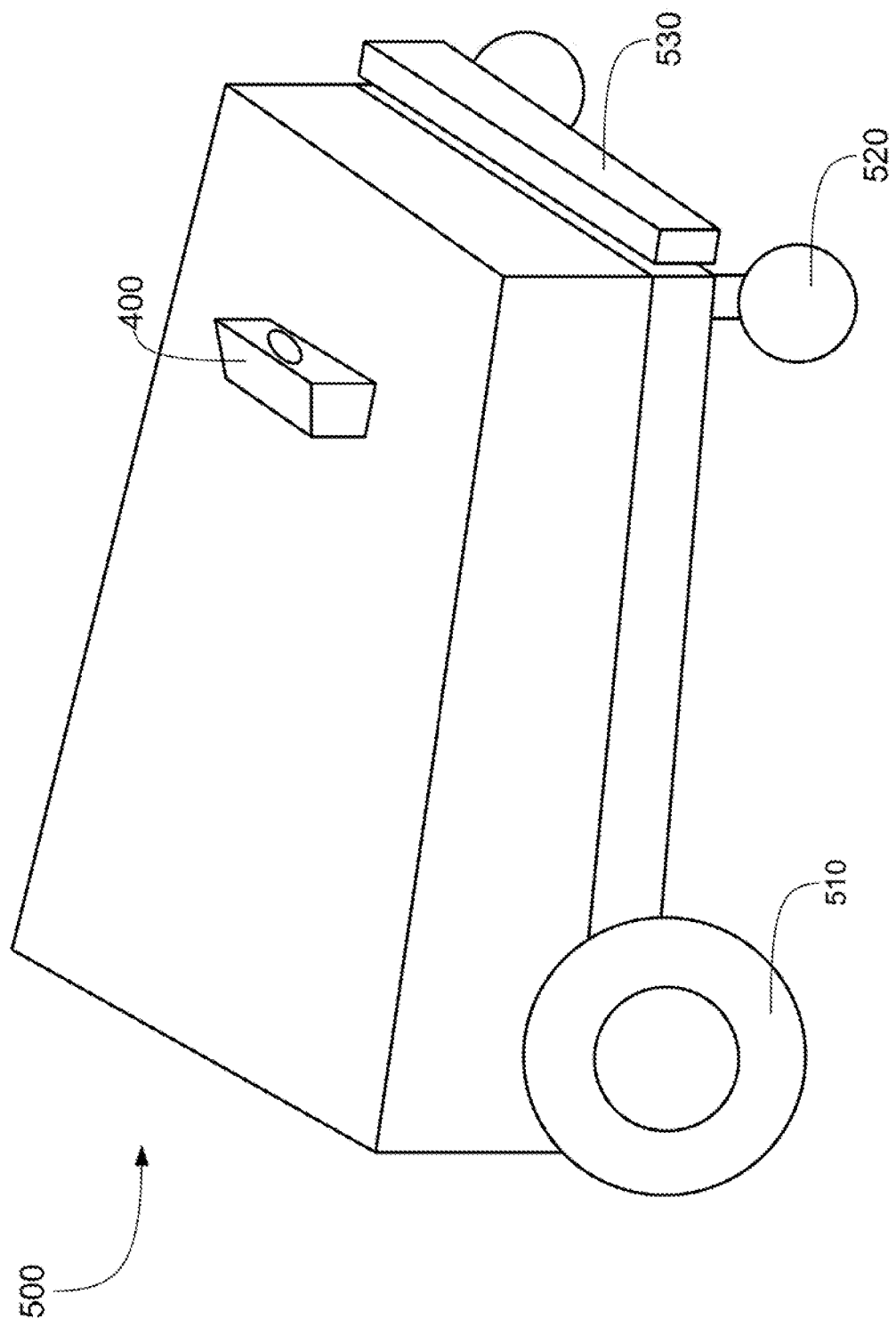
FIG. 6 is a perspective view of a first autonomous residential mower incorporating the system of the present disclosure.
Figure 7B:
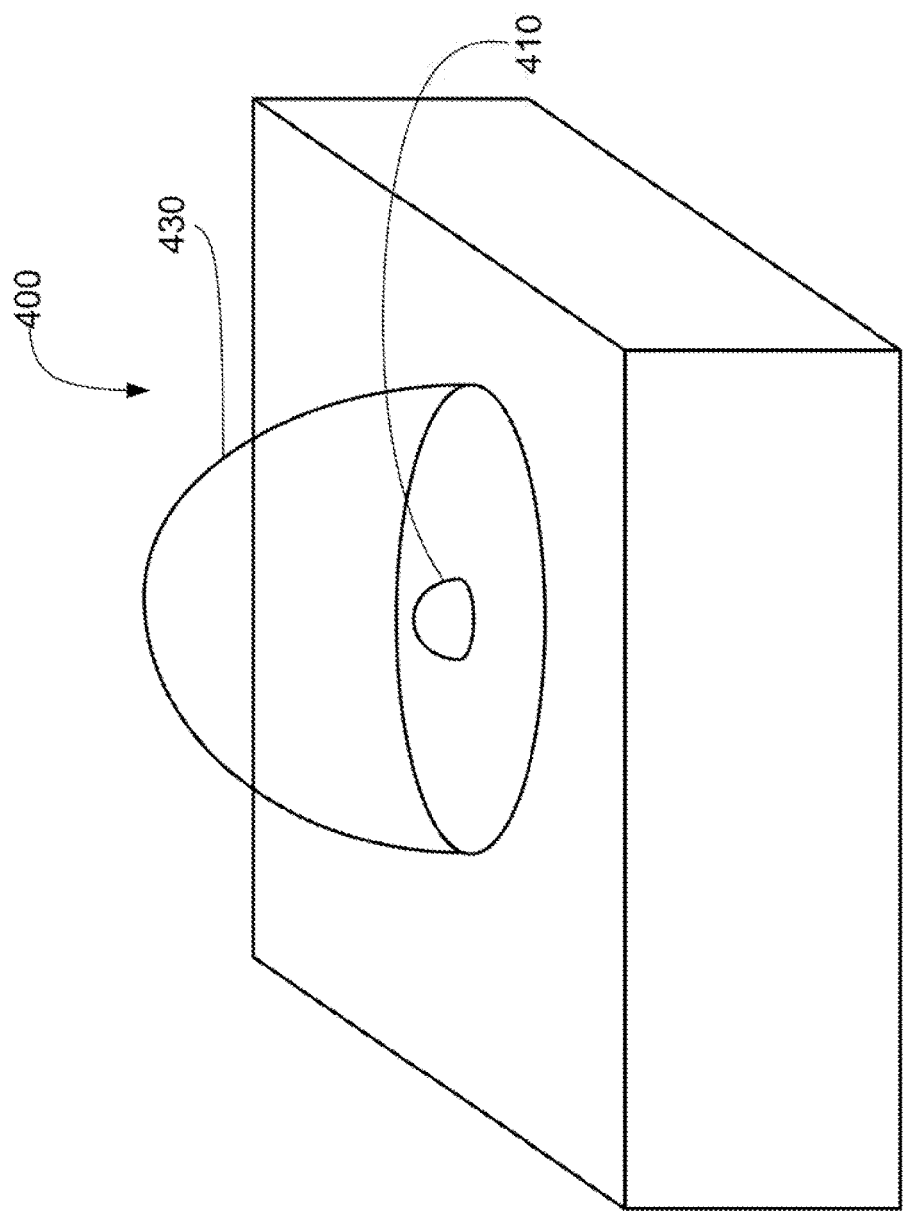
FIG. 7B is a perspective view of a typical 360 degree camera for use in connection with the system of the present disclosure.
Figure 8:
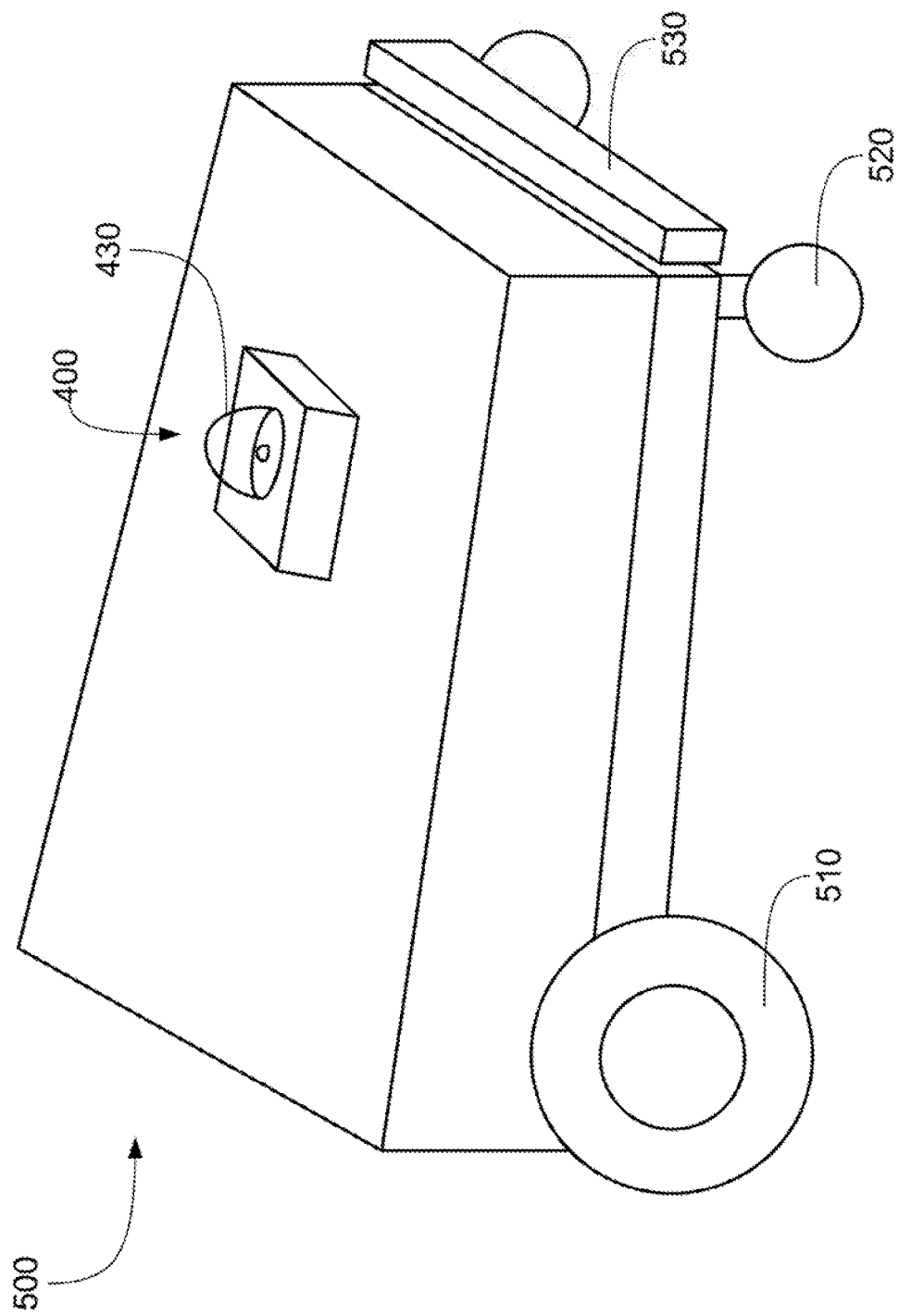
FIG. 8 is a perspective view of a second autonomous residential mower incorporating the system of the present disclosure.
Figure 9:
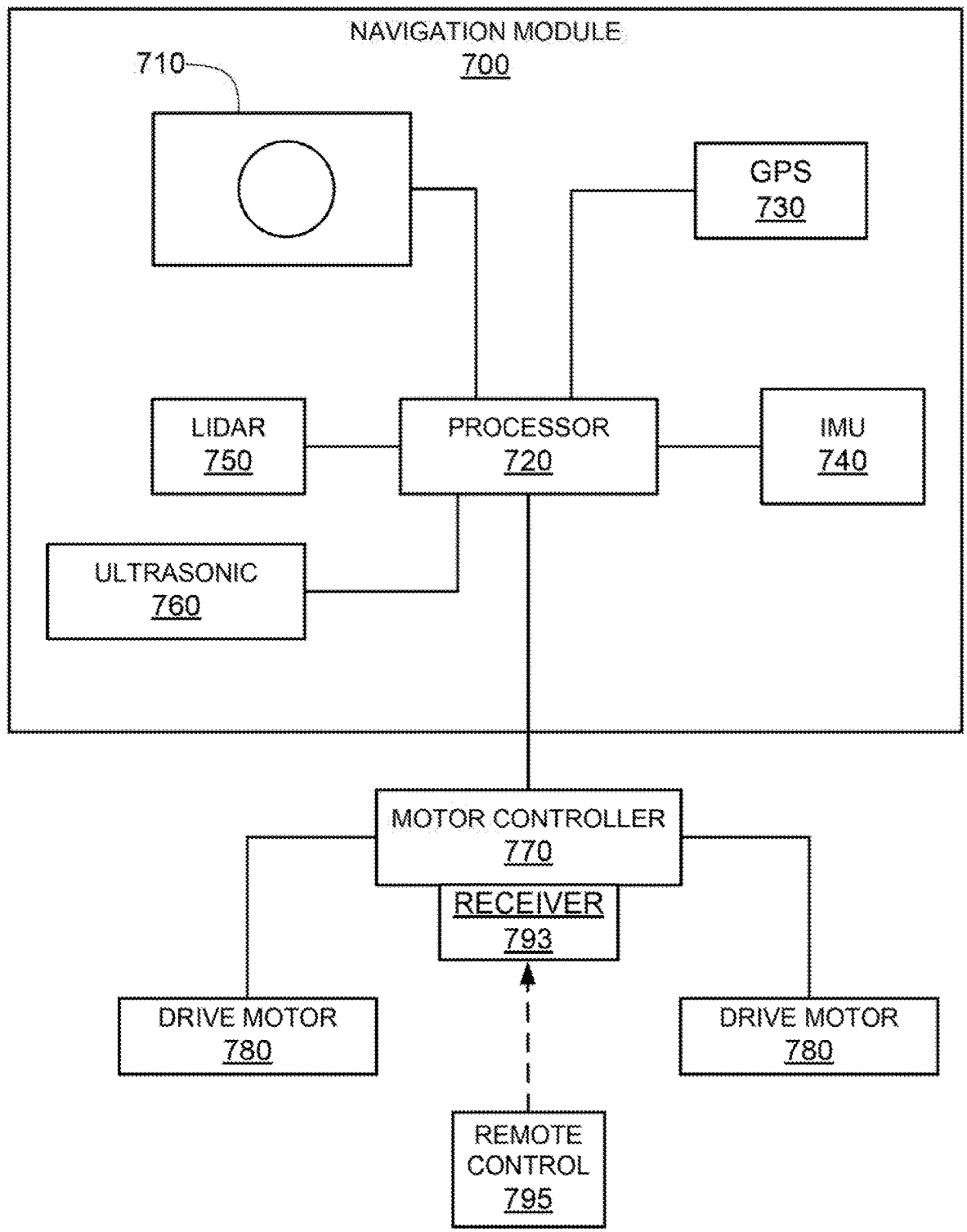
FIG. 9 is a schematic view of an exemplary system in accordance with the teachings of this disclosure.

FIGS. 6 and 8 depict exemplary autonomous mowers 500 which include a camera disposed in a camera housing 400 and a bump sensor 530, and these components may be connected to a processor 720 shown in FIG. 9. Driven wheels 510 power the autonomous mowers 500, while front wheels 520 are not powered in these embodiments. The primary difference in these two embodiments is in the shape of the camera housing, where FIG. 8 uses the camera dome type housing of FIG. 7B. These exemplary mowers 500 may also include the navigation features discussed in detail below, but not depicted in these figures.

Figure 7:
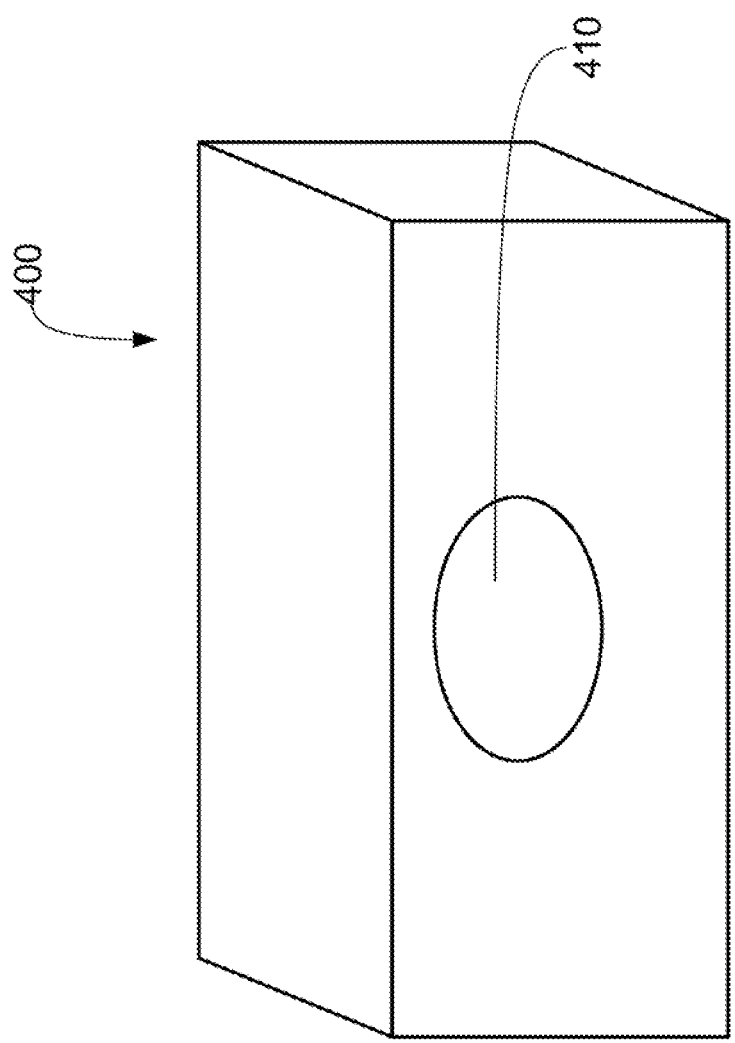
FIG. 7 is a perspective view of typical single camera for use in connection with the system of the present disclosure.
Figure 7A:
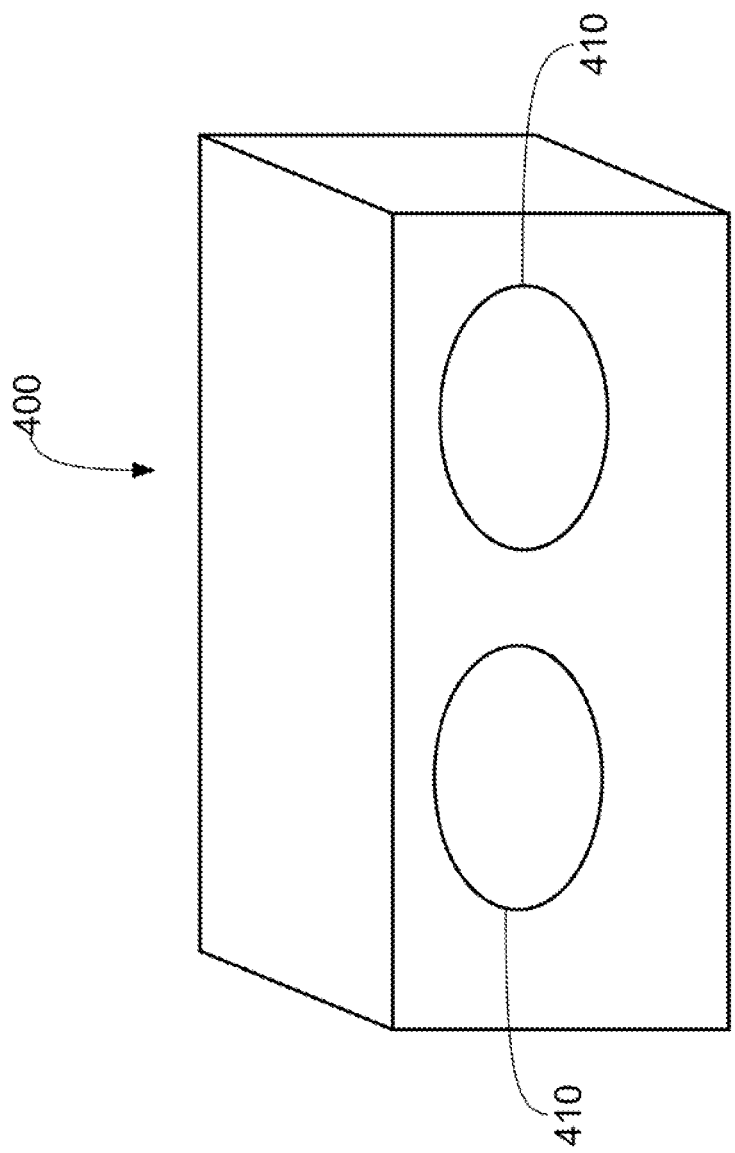
FIG. 7A is a perspective view of typical dual camera for use in connection with the system of the present disclosure.
Figure 7C:
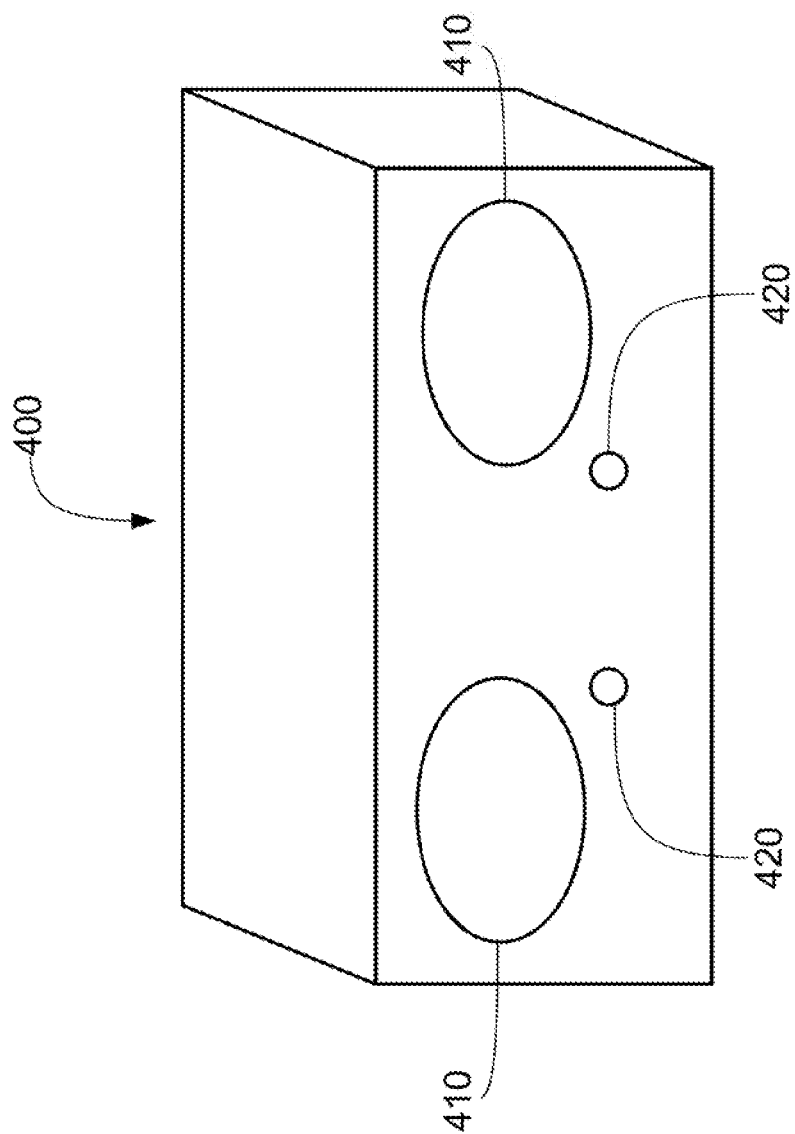
FIG. 7C is a perspective view of a typical dual camera set up with dual laser for use in connection with the system of the present disclosure.

Different types of cameras may be used with the vehicles depicted herein in accordance with the teachings of this disclosure. For example, FIG. 7 depicts a typical single camera housing 400 with a single camera lens 410 for use in connection with the system of the present disclosure. FIG. 7A depicts a dual camera housing 400 with a pair of camera lenses 410. FIG. 7B is a perspective view of a typical 360 degree camera having a dome 430 for use with lens 410. FIG. 7C depicts a dual camera housing 400 with dual lenses 410 and dual laser lenses 420. FIG. 7D shows that camera housing 400 may be placed on a mount 401. It will be understood that the effect of the embodiments with multiple lenses could be accomplished with multiple separate cameras.

Figure 10:
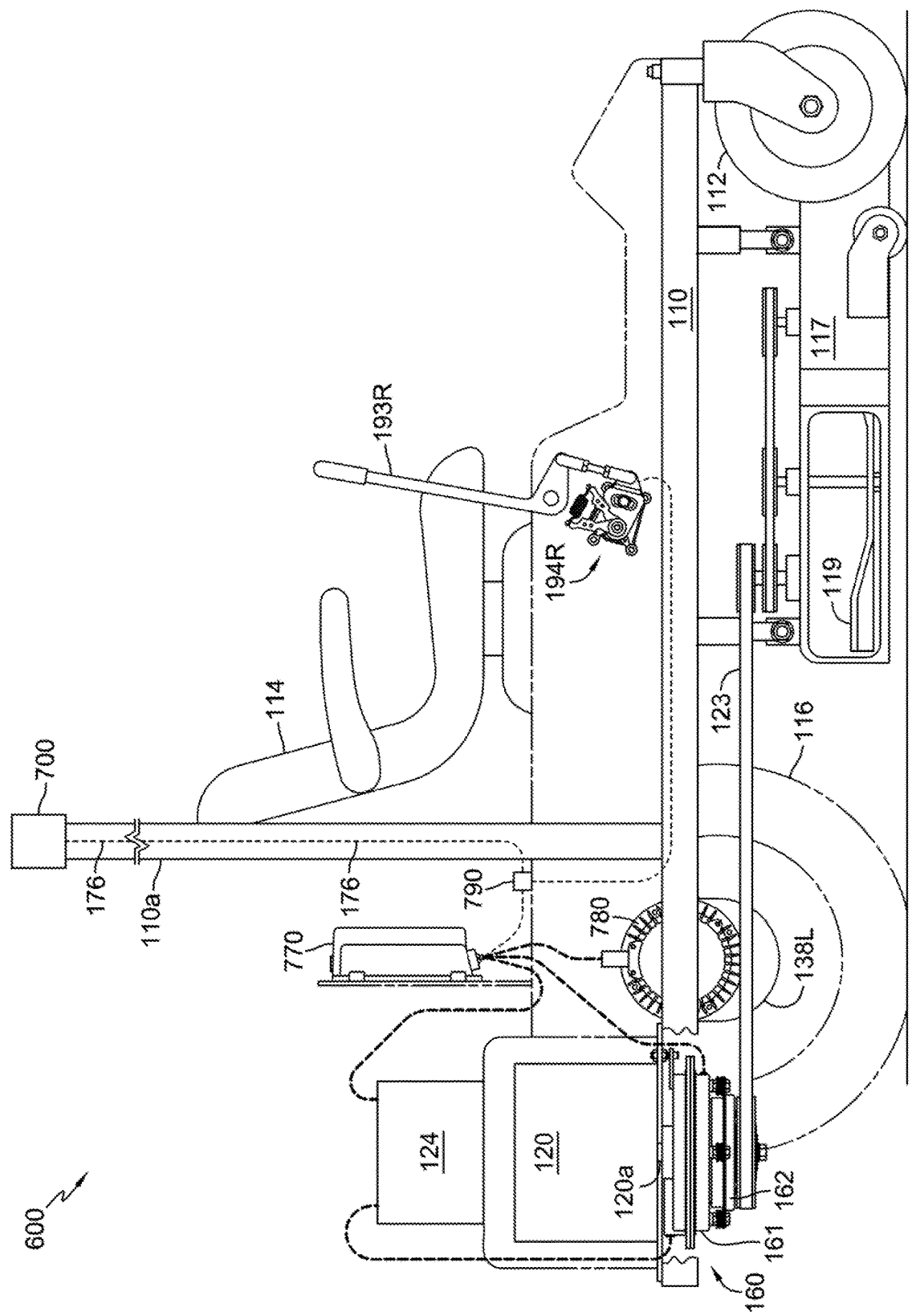
FIG. 10 is a side view of a lawn mowing vehicle incorporating an embodiment of the system of the present disclosure.

FIG. 10 shows an exemplary vehicle 600 on which a navigation module 700 may be mounted on upright frame member 110a extending upwardly from vehicle frame 110. It will be understood that portions of vehicle 600 are shown in a schematic format, and portions of vehicle 600 such as one of the driven wheels 116 are removed for clarity. A pair of caster wheels 112 are disposed at the front of vehicle frame 110. Other components of vehicle 600 may include a generator and clutch-brake assembly 160 comprising a generator 161 and clutch-brake 162. Navigation module 700 may be connected via communication network 790 to motor controller 770 which, in this embodiment, is shown as being disposed separate from the housing in which navigation module 700 is located. Motor controller 770 is connected to, among other things, an electric drive 138L for powering a driven wheel 116, where electric drive 138L has a drive motor 780 powered by motor controller 770 and may further include a gear reduction, e.g. a planetary or spur gear reduction. For clarity, this view of FIG. 10 does not show the other driven wheel 116 or the right side electric drive 138R. Other components of vehicle 600 include a battery 124 and a prime mover 120. A pulley system 123 connects prime mover output shaft 120a to mowing deck 117 to drive mowing blades 119. An operator seat 114 is disposed on vehicle frame 110 and the operator may control output of the drive system through control lever 193R and control assembly 194R, and the corresponding control lever 193L and control assembly 194L for the other side of vehicle 600 (lever 193L and assembly 194L are not visible in this side view). Other drive systems can be used in connection with the disclosed system, including a hydraulic drive using electronic actuators to control the output of the drive assemblies.

FIG. 9 is a schematic view of a navigation module 700, and the various elements discussed herein may be placed in a common housing, as shown, or mounted separately on a vehicle such as mower 500 or vehicle 600. This navigation module may include camera 710, a GPS unit 730, a LIDAR unit 750 used for obstacle detection, IMU 740 and ultrasonic sensor 760. These components may be connected to a processor 720, which could be internal to motor controller 770. Motor controller 770 is connected to and controls the output of drive motors 780. It will be understood that certain of the sensors may be best located outside the common housing. For example, the IMU 740 may best be located near the center of gravity of the vehicle, and the GPS unit 730 could be remote mounted as well to improve performance. A connection to a communication network 790 through conductors 176 may be used here, and this communications network 790 may be similar to that disclosed in commonly owned U.S. patent application Ser. No. 15/056,839, issued as U.S. Pat. No. 9,980,434, the teachings of which are incorporated herein by reference in their entirety.

This system may be used with lawnmowers having various drive systems, including hybrid drives such as that shown in FIG. 10, fully mechanical drives using hydrostatic transaxles or drive motors having electronic controls, and fully electric drives. By way of example, such drives are shown in commonly owned U.S. Pat. No. 9,499,199 and U.S. patent application Ser. No. 14/918,465. The teachings of all of the commonly owned prior art references are incorporated herein by reference in their entirety.

As noted before, the method of establishing the perimeter of a lawn to be mowed may entail remote control operation of a vehicle such as mower 500 or vehicle 600 with the appropriate equipment. An optional remote control 795 is shown in FIG. 9, and may be remotely connected to a receiver 793 that is connected to or otherwise in communication with motor controller 770 (or, alternatively, in communication with the processor 720). Details of a remote control vehicle and operation thereof may be found in commonly owned U.S. Pat. No. 9,867,331, the terms of which are incorporated herein by reference. By way of example, operation of a vehicle, such as the mower 500 or the vehicle 600, is controlled using speed, directional, and/or steering control inputs received from the remote control 795.

Figure 11:
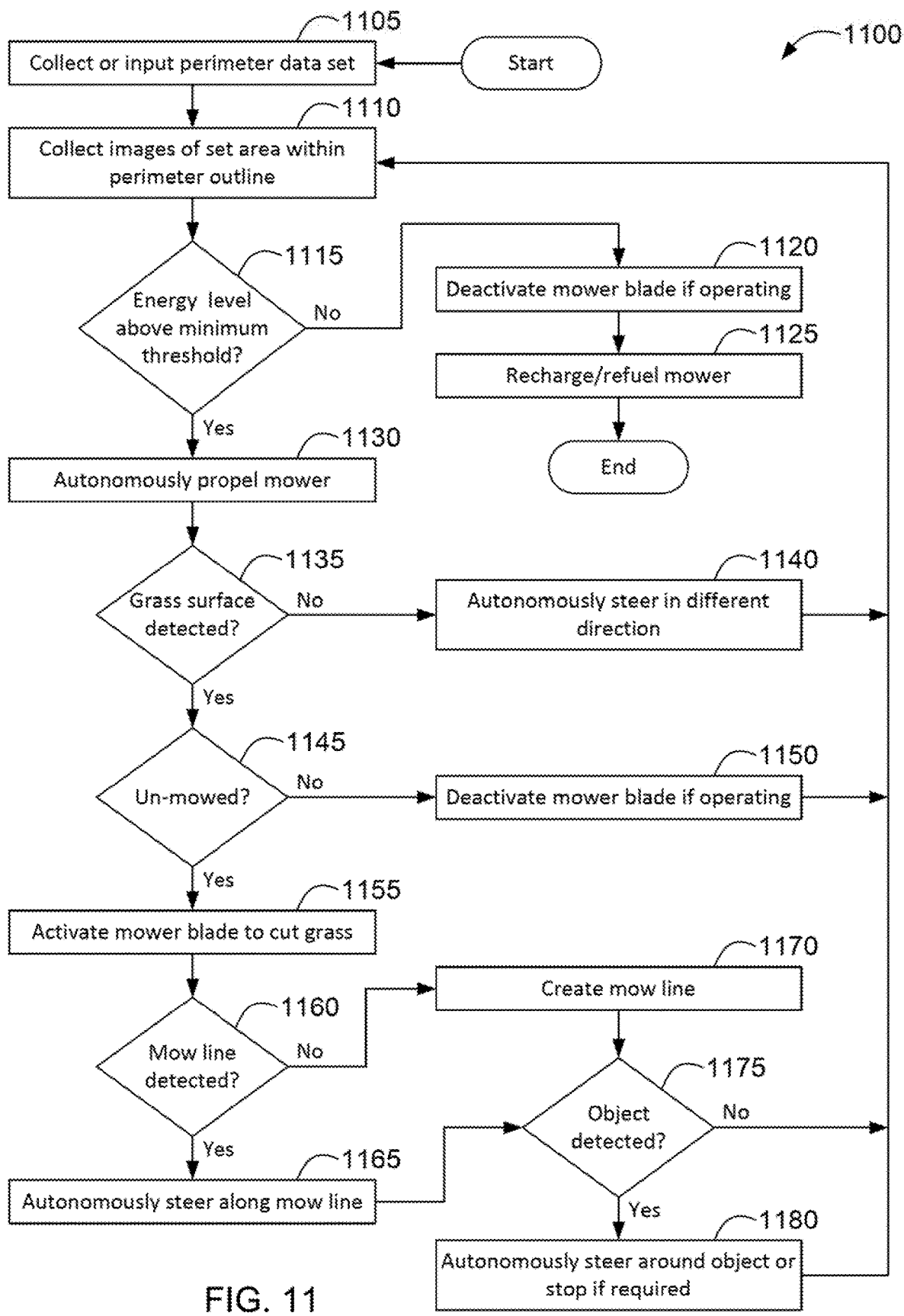
FIG. 11 is a flowchart for controlling an autonomous lawn mower in accordance with the teachings herein.

FIG. 11 is a flowchart of an example method 1100 to control an autonomous lawn mower. The flowchart is representative of machine readable instructions that are stored in memory and include one or more programs which, when executed by a controller, control an autonomous lawn mower (e.g., the autonomous mower 500, the vehicle 600). While the example program is described with reference to the flowchart illustrated in FIG. 11, many other methods of controlling an autonomous lawn mower may alternatively be used. For example, the order of execution of the blocks may be rearranged, changed, eliminated, and/or combined to perform the method 1100. Further, because the method 1100 is disclosed in connection with the components of FIGS. 1-10, some functions of those components will not be described in detail below.

Initially, at block 1105, the processor 720 collects a perimeter data set that includes a perimeter outline of at least one perimeter of a lawn to be mowed. In some examples, the processor 720 is capable of receiving the perimeter data set from a handheld computer (e.g., a tablet computer, cellular telephone or similar device incorporating a GPS unit) that collects the perimeter data set utilizing the GPS unit of the handheld computer. For example, the handheld computer collects the perimeter data set of the perimeter outline (i) via the GPS unit of the handheld device as the handheld device is manually carried along the perimeter outline and/or (ii) by receiving an input from a user that identifies the perimeter outline using a mapping application. In some examples, the processor 720 collects the perimeter data set as the autonomous lawn mower is manually controlled to mow along the perimeter outline. For example, the autonomous lawn mower is manually controlled via (i) at least one control lever (e.g., the control lever 193L, the control lever 193R) of the autonomous lawn mower and/or (ii) the remote control 795 in communication with the receiver 793 of the autonomous lawn mower. Further, in some examples, the perimeter data set includes a plurality of perimeter outlines within a single lawn for which each of the plurality of perimeter outlines defines a corresponding set area to be mowed separate from the other set areas. It will be understood that a laptop may be plugged into communication network 790 to download the perimeter data set.

At block 1110, the camera 710 collects images of a set area within the perimeter outline. At block 1115, the processor 720 determines whether an energy level of a power source of the autonomous lawn mower is above a minimum threshold. For example, the processor 720 determines whether the energy level of the battery 124 is above a minimum charge threshold. In response to the processor 720 determining that the energy level is not above the minimum threshold, the method 1100 proceeds to block 1120 at which the processor 720 deactivates the mowing blade 119 if the mowing blade 119 is currently operating. At block 1125, the processor 720 causes the autonomous lawn mower to return to a set location where it may be recharged and/or refueled, which may be a home base or the starting point where operation began. For example, to recharge the battery 124 of the autonomous lawn mower, the processor 720 instructs the motor controller 770 to autonomously steer the autonomous lawn mower toward a home base at which the battery 124 is recharged. Upon completing block 1125, the method 1100 ends. Returning to block 1115, in response to the processor 720 determining that the energy level of the autonomous lawn mower is above the minimum threshold, the method 1100 proceeds to block 1130 the motor controller 770 autonomously propels the autonomous lawn mower utilizing one or more of the drive motors 780 to move in the set area within the perimeter outline. Additionally or alternatively, at block 1115, the processor 720 may determine whether the autonomous lawn mower has been operating for a period of time longer than a maximum threshold. In such examples, the method 1100 proceeds to block 1120 when the autonomous lawn mower has been operating for a period of time longer than the maximum threshold and proceeds to block 1130 when the autonomous lawn mower has not been operating for a period of time longer than the maximum threshold.

At block 1135, the processor 720 determines whether a grass surface has been detected based on the images collected by the camera 710. In response to the processor 720 not detecting a grass surface, the method 1100 proceeds to block 1140 at which the motor controller 770 autonomously steers the autonomous lawn mower in a different direction. Upon completing block 1140, the method 1100 returns to block 1110. Otherwise, in response to the processor 720 detecting a grass surface, the method 1100 proceeds to block 1145 at which the processor 720 determines whether the grass surface is un-mowed. For example, the processor 720 identifies mowed section(s) (e.g., the mowed section 230 of FIG. 2) and/or un-mowed section(s) (e.g., the un-mowed section 220 of FIG. 2) based on the images collected by the camera 710. In response to the processor 720 determining that grass surface is not un-mowed (i.e., mowed), the method 1100 proceeds to block 1150 at which the processor 720 deactivates the mowing blade 119 if the mowing blade 119 is currently operating. Upon completing block 1150, the method 1100 returns to block 1110. Otherwise, in response to the processor 720 determining that grass surface is un-mowed, the method 1100 proceeds to block 1155 at which the processor 720 activates the mowing blade 119 to mow the un-mowed section.

At block 1160, the processor 720 determines whether a mow line (e.g., the mow line 210 of FIG. 2) between a mowed section (e.g., the mowed section 230) and an un-mowed section (e.g., the un-mowed section 220) is detected based on the images collected by the camera 710. In response to the processor 720 detecting a mow line, the method 1100 proceeds to block 1165 at which the motor controller 770 autonomously steers the autonomous lawn mower to follow along the mow line between the mowed section and the un-mowed section in the set area within the perimeter outline. That is, the motor controller 770 autonomously steers the autonomous lawn mower based on the perimeter outline of the at least one perimeter and the images captured by the camera 710. Upon completing block 1165, the method 1100 proceeds to block 1175. Otherwise, in response to the processor 720 not detecting a mow line, the method 1100 proceeds to block 1170 at which the autonomous lawn mower creates a mow line by mowing at least a portion of the un-mowed portion. Upon completing block 1170, the method 1100 proceeds to block 1175.

At block 1175, the processor 720 determines whether there is an object that is detected based on the images captured by the camera 710. In response to the processor 720 not detecting an object, the method 1100 returns to block 1110. Otherwise, in response to the processor 720 detecting an object, the method 1100 proceeds to block 1180 at which the motor controller 770 autonomously steers the autonomous lawn mower around the object (e.g., to avoid a collision with the object). Upon completing block 1180, the method 1100 returns to block 1110. It will be understood that while the object detection step 1175 is depicted as occurring after step 1165, this object detection step 1175 is in fact occurring at all times during movement of the mower, and will impact direction or movement of the mower at any point where an object is detected by processor 720.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A method for operating a lawn mower, the method comprising:
   receiving, via a receiver of the lawn mower, directional control inputs of user command signals from a handheld device;
   steering, via a controller of the lawn mower, the lawn mower to mow according to the directional control inputs of the user command signals received from the handheld device;
   creating a perimeter outline of a mowing area for autonomous control of the lawn mower, via a global positioning system (GPS) unit of the lawn mower, as the lawn mower is controlled according to the directional control inputs of the user command signals received from the handheld device;
   collecting, via at least one camera of the lawn mower, images of the mowing area within the perimeter outline;
   mowing, by activating a mowing blade of the lawn mower, grass within the mowing area; and
   autonomously steering, via the controller, the lawn mower based on the perimeter outline of the mowing area and the images captured by the at least one camera, wherein the step of autonomously steering the lawn mower further includes autonomously steering the lawn mower to follow a mow line between a mowed section and an un-mowed section within the mowing area.

2. A method for operating a lawn mower, the method comprising:
   receiving, via a receiver of the lawn mower, directional control inputs of user command signals from a handheld device;
   steering, via a controller of the lawn mower, the lawn mower to mow according to the directional control inputs of the user command signals received from the handheld device;
   creating a perimeter outline of a mowing area for autonomous control of the lawn mower, via a global positioning system (GPS) unit of the lawn mower, as the lawn mower is controlled according to the directional control inputs of the user command signals received from the handheld device;
   collecting, via at least one camera of the lawn mower, images of the mowing area within the perimeter outline;
   mowing, via a mowing blade, grass within the mowing area, by:
      activating the mowing blade upon identifying, based on the images captured by the at least one camera, that the lawn mower is travelling over an un-mowed section of the mowing area; and
      deactivating the mowing blade upon identifying, based on the images captured by the at least one camera, that the lawn mower is travelling over a mowed section of the mowing area; and
   autonomously steering, via the controller, the lawn mower based on the perimeter outline of the mowing area and the images captured by the at least one camera.

3. A lawn mower for mowing within an environment, the lawn mower comprising:
   a mowing blade;
   a global positioning system (GPS) unit configured to a identify a position of the lawn mower;
   a receiver configured to receive user command signals that include directional control inputs from a handheld device;
   at least one camera configured to collect images of a mowing area; and
   a processor configured to:
      detect a mow line that separates a mowed section and an un-mowed section within the mowing area based on the images captured by the at least one camera;
      activate the mowing blade;
      steer the lawn mower to mow according to the directional control inputs of the user command signals received from the handheld device;
      create a perimeter outline of the mowing area for autonomous control of the lawn mower using data collected by the GPS unit as the lawn mower is controlled according to the directional control inputs of the user command signals received from the handheld device; and
      autonomously steer the lawn mower based on the perimeter outline of the mowing area and the images captured by the at least one camera, wherein, to autonomously steer the lawn mower, the processor is configured to steer the lawn mower to follow the mow line that separates the mowed section and the un-mowed section.

* * * * *